United States Patent Office 3,117,614
Patented Jan. 14, 1964

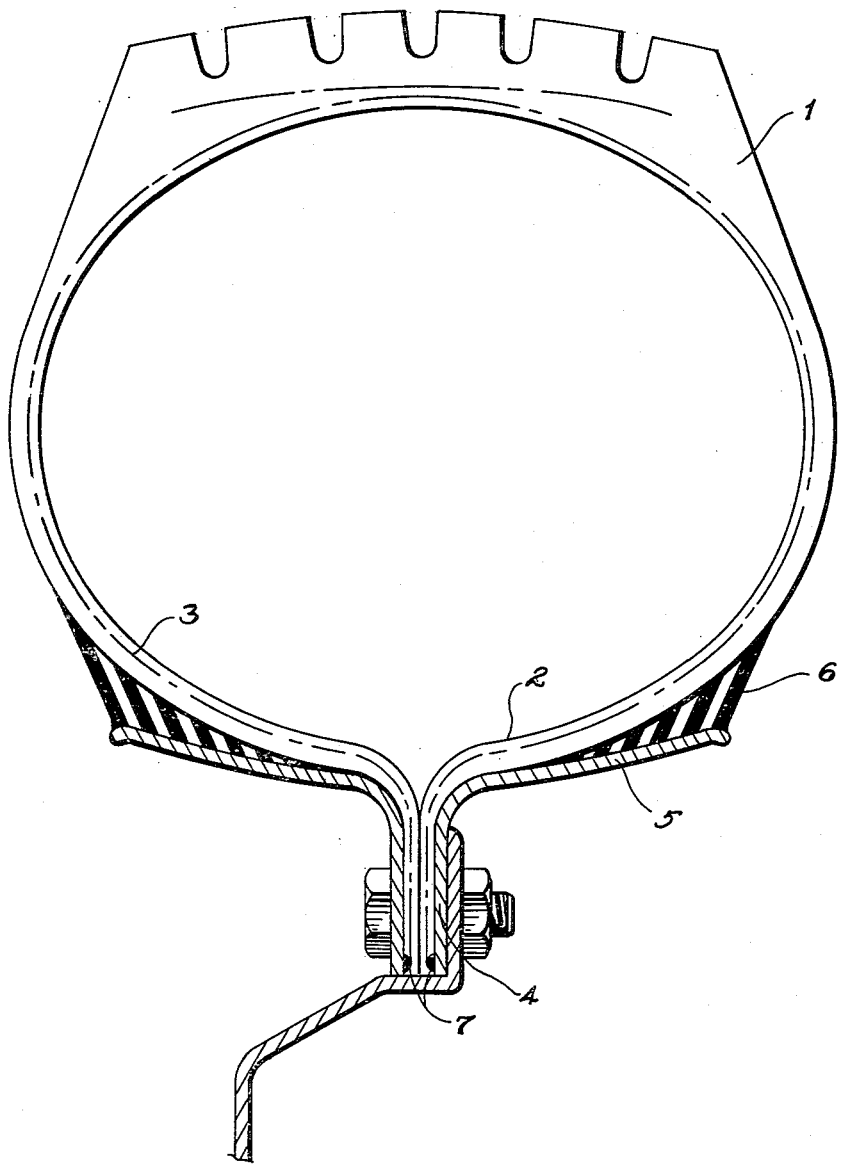

3,117,614
COMBINED PNEUMATIC TIRE AND RIM ASSEMBLY
Luigi Amici, Milan, Italy, assignor to Pirelli S.p.A., Milan, Italy
Filed Apr. 20, 1962, Ser. No. 189,009
Claims priority, application Italy May 6, 1961
2 Claims. (Cl. 152—363)

The present invention relates to a pneumatic tire for vehicle wheels, and more particularly, it concerns a tire in which the ends of the carcass plies, instead of being folded about the metal cores or bead wires, are directly fastened to a specially designed rim which is divided into two halves, the latter being secured by bolts to the wheel web. More specifically, the present invention constitutes an improvement over the invention set forth in prior copending application Serial No. 838,124, filed on September 4, 1959, now Patent No. 3,047,041.

The aforementioned prior application discloses a tire in which the zones corresponding to the beads of the conventional tire are permanently fastened by adhesion to a separable rim assembly which can be divided into two halves, each half including at least one annular profile. These zones of the tire (hereinafter referred to as "skirtings") contain the extremities of the carcass plies and have a tapered shape in cross section. These skirtings adhere to the annular profiles along the entire surface in contact with them, the adhesion between the skirtings and the profiles preferably being obtained during the vulcanization of the tire. The ends of the carcass can extend as far as the region where the two rim halves abut so as to be locked between them when the rim halves are bolted together.

In the aforementioned application it is also stated that the annular profiles can be indented or serrated in order to improve the adhesion between the carcass and the profiles. Furthermore, the annular profiles can be provided with suitably shaped extensions having a stiffness or rigidity less than that of the profiles in order to obtain a gradual reduction of the stiffness in the region extending from the annular profiles to the sides of the tire. Finally, it is stated that each of the two halves of the rim can be constituted by two or more concentric annular profiles and that the various carcass plies can be divided into groups, each of which is fastened to a profile or is inserted between two concentric profiles. This expedient thereby increases the area of the fastening surfaces between the carcass and the rim whenever it is felt necessary or desirable to do so.

In a tire of the type described above, it should be apparent that the inflation pressure which tensions the cords of the carcass plies also causes shearing stresses in the bonding rubber in the area corresponding to the contacting surface between the plies and the annular profiles. Other factors being equal, the amount of these stresses depends upon the value of the inflation pressure and upon the area of the contacting surface; more precisely, these stresses are proportional to the inflation pressure and inversely proportional to the area of the contacting surfaces.

Therefore, the need of increasing the area of contact generally arises when it is desired to construct a tire which is to be inflated at a higher pressure, assuming, of course, that it is desired to maintain the shearing stress on the bonding rubber within certain limits. A higher inflation pressure naturally involves a higher tensile stress on the carcass plies, but this problem is often solved by using plies of steel cords which have a much higher resistance to deformation than textile cords of equal cross section. Thus, it is possible to manufacture tires such as those designed for trucks and buses where the carcass can be provided with a small number of plies, such as two, capable of working at very high pressures; furthermore, if the carcass is of the so-called "radial" type, the number of plies can be reduced to one.

If a tire according to the aforementioned prior application is provided with a metallic carcass (in particular, if constituted by a single ply) and inflated at a high pressure, the shearing stress on the bonding rubber will be very high, since it is not possible to adopt the expedient of distributing the various plies on a plurality of annular concentric profiles where the number of plies is small. Therefore, under the above conditions, it is possible that high inflation pressures could cause the detachment of the carcass from the annular profiles.

The present invention provides a tire similar to that disclosed in the aforementioned prior application but wherein the carcass includes one or more metallic plies and wherein the tire is specially designed to obviate the possibility of detachment of the carcass from the annular profiles even when the tire is inflated at very high pressures.

As will hereinafter appear more fully, the pneumatic tire according to the present invention has a carcass which includes plies constituted by rubberized metallic cords wherein the plies are permanently fastened to a separable rim formed by at least two metallic annular profiles; the carcass is fastened to the rim by the adhesion of the rubber to the profiles, but the tire is further characterized in that the metallic cords are connected directly to the metallic profiles without the interposition of rubber. For example, the securing of the ends of the cords constituting the carcass plies can be effected by attaching these ends to two metallic auxiliary rings and then by fastening the latter (by means of bolts, soldering, or joints) to the annular profiles.

In accordance with a preferred embodiment of the present invention, the metallic cords are directly fastened by soldering to the metallic annular profiles. It should be obvious that the metallic cords must not be covered with rubber in the soldering area and, further, that the soldering can be carried out by following any conventional system. The soldering can be effected in any portion of the contacting surface between the plies and the annular profiles; however, it is preferable that the soldering occurs in the region of the ply edges.

Therefore, it is a principal object of the present invention to provide a tire of the type described above wherein the carcass is designed to adhere to the divisible halves of a separable rim assembly; the carcass adheres to annular profiles forming portions of the rim halves by the adhesion between the rubber and the surfaces of the profile; the carcass is further permanently connected to the rim assembly by the expedient of employing metallic carcass plies, the ends of which are soldered to the profiles.

Other and further objects and advantageous features of the present invention will hereinafter more fully appear in connection with the attached drawing which illustrates, by way of non-limiting example, a semi-diagrammatic representation, at transverse cross section, of a pneumatic tire constructed in accordance with this invention.

In the drawing, the reference numeral 1 indicates the tire generally. The inner portion of the tire is defined by the skirtings 2 which contain the ends of the carcass plies 3, the latter being constituted by at least one metallic ply. The skirtings are clamped between two metallic annular profiles 4 having axially extending outer portions 5. The outer portions of the profiles are provided with extensions 6 which are less rigid than the profiles and which are constituted by rubber compound having a hardness greater than that of the rubber compound constituting the carcass.

As shown in the drawing, the ends of the cords of the metallic carcass ply 3 are fastened to the metallic annular profiles by means of solderings indicated by reference numeral 7. This soldering is carried out along the edges of the carcass and extends circumferentially along the entire peripheral development of these edges. If desired, the ends of the plies 3 can be connected (by soldering or any other suitable means) to two metallic auxiliary rings which, in turn, are fastened to the annular profiles by means of bolts, soldering, joints, etc. Thus, the reference numeral 7 should be considered as a diagrammatic representation of the several methods of attaching the ends of the carcass plies to the annular profiles 4. Where the term "soldering" appears above and in the appended claims, it should be understood that this term also includes welding, brazing or any other suitable method of making a metal-to-metal connection.

Whereas, the present invention has been described particularly in relation to the drawing attached hereto, it should be understood that other and further modifications, apart from those shown or suggested herein, may be made within the spirit and scope of this invention.

What is claimed is:

1. A combined pneumatic tire and rim assembly comprising a tire carcass having at least one carcass ply constituted by rubberized metal cords, a rim assembly divisible into two halves, each rim half having at least one metallic annular profile, each end portion of said ply being soldered to one of said rim halves in the area corresponding to the edges of the carcass and along its entire peripheral development, and said metal cords being connected directly to said annular metallic profiles.

2. A combined pneumatic tire and rim assembly comprising a tire carcass having at least one carcass ply constituted by rubberized metal cords, a rim assembly divisible into two halves, each rim half having at least one metallic annular profile, each end of said ply being soldered to an auxiliary ring which is connected in turn to one of the annular metallic profiles, and said metal cords being connected directly to said annular metallic profiles.

References Cited in the file of this patent

UNITED STATES PATENTS

| | | |
|---|---|---|
| 589,434 | Hooper | Sept. 7, 1897 |
| 3,047,041 | Bottasso et al. | July 31, 1962 |